METAL PARTICLES AND METHOD OF MAKING

Original Filed Aug. 26, 1957 2 Sheets-Sheet 1

INVENTOR
LEO J. NOVAK
BY Taulmin & Taulmin
ATTORNEYS

METAL PARTICLES AND METHOD OF MAKING
Original Filed Aug. 26, 1957 2 Sheets-Sheet 2
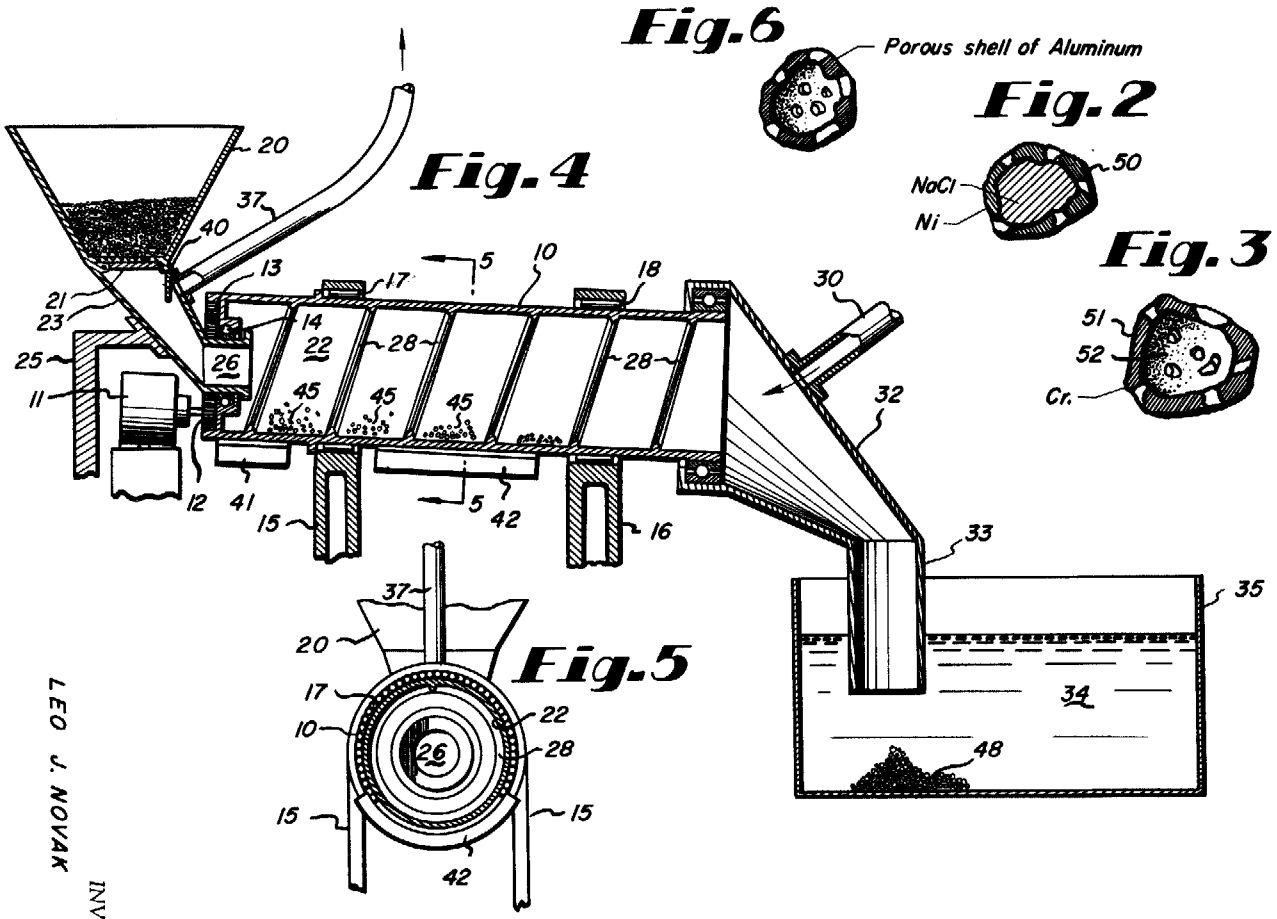
INVENTOR
LEO J. NOVAK
BY Taulmin & Taulmin
ATTORNEYS United States Patent Office Re. 25,454
Reissued Oct. 1, 1963

25,454

METAL PARTICLES AND METHOD OF MAKING

Leo J. Novak, Elizabeth, N.J., assignor to The Commonwealth Engineering Company of Ohio, Dayton, Ohio Original No. 2,930,767, dated Mar. 29, 1960, Ser. No. 680,311, Aug. 26, 1957. Application for reissue Jan. 23, 1961, Ser. No. 84,468
14 Claims. (Cl. 252—477)

Matter enclosed in heavy brackets [ ] appears in the original patent but forms no part of this reissue specification; matter printed in italics indicates the additions made by reissue.

This invention relates to the art of gas plating and wherein metal coatings are deposited by thermal decomposition of a gaseous metal compound and which are heat-decomposable in contact with the article or substrate to be plated with the metal constituent of the compound. Such gas plating processes have been found to have particular utility for depositing metal coatings at temperatures far below the melting points of the metals. The processes are also operable at normal or sub-normal atmospheric pressures.

It is an object of the present invention to gas plate particles which are solid and which may be utilized as a catalyst in the carrying out of various chemical processes.

It is another object of the invention to provide an article by gas plating particles such as in the form of crystals and which crystals are gas plated to provide a thin, porous film of metal over the crystals and thereafter said gas plated crystals are leached with a solvent of the crystals so as to dissolve the same out and leave a hollow, relatively porous shell of the metal deposited by gas plating. Such products may be used as a catalyst or as fine particles of metal. Such fine, divided particles of metal may also be used in the making of sintered metal products such as bearings and the like.

Another object of the invention is to produce a product wherein particles of solids such as composed of inorganic materials such as silica, sand, carbon and the like, and which are coated with a shell of metal by gas plating to provide a product which is useful where powdered metal or the like is desired.

These and other objects and advantages of the invention will become apparent from the following description taken in conjunction with the drawings, wherein—

FIGURE 2 is an enlarged cross section of a crystal of sodium chloride gas plated to provide the same with a thin shell or coating of nickel;

FIGURE 3 is a similar view in cross section of a metal particle which has been leached after gas plating a crystal of sodium chloride to dissolve out the sodium chloride and leaving a metal shell;

FIGURE 4 illustrates an apparatus embodiment for carrying out the process, including the steps of gas plating the particles and leaching the same, the apparatus being illustrated in cross section to better illustrate its construction;

FIGURE 5 is a cross section taken substantially on the line 5—5 of FIGURE 4 and looking in the direction of the arrows; and FIGURE 6 is an enlarged cross section of a perforated metal shell particle which has been made by gas plating to provide a porous metal shell.

Figure 1:
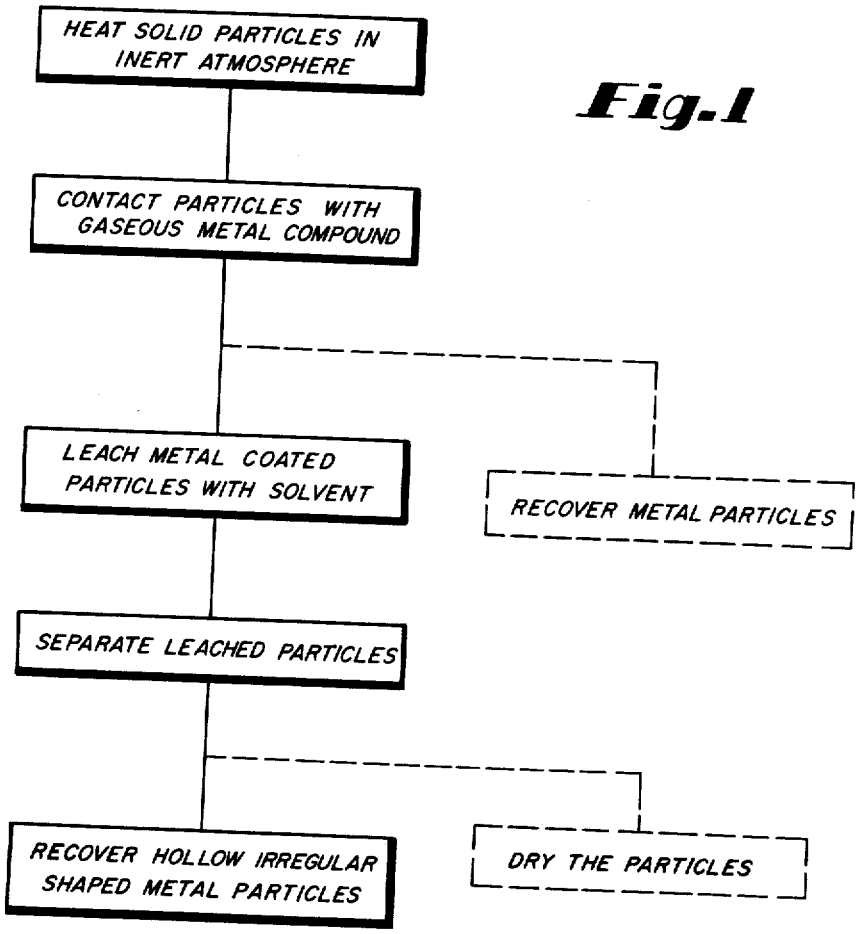
FIGURE 1 is a flow sheet illustrating the steps of applicant's process for gas plating solid particles to produce hollow, irregular shaped metal particles.

In carrying out the invention, solid particles which are to be gas plated are introduced into a receptacle or compartment and heated to a temperature sufficient to thermally decompose the gaseous metal compound brought in contact therewith, and which compound comprises the metal which is to be deposited on the particles. The particles, after being gas plated, are recovered and provided the same are to be leached, are deposited in a leaching bath containing solvent for the solid or core portion of the articles.

The gas plated particles are treated with a solvent such as water as in the case of crystals which are soluble in the water so as to dissolve out the core portion and leave leached, irregular shaped particles of metal. These are then recovered from the leaching solution and allowed to dry, or are force air dried, to provide the porous, irregular shaped particles of metal.

The method steps are illustrated in FIGURE 1, and wherein the dry particles are recovered which are either solid throughout, having a core formed of the substrate, or where the particles have been gas plated and leached, then hollow, irregular shaped metal particles are recovered, as shown in the flow sheet of FIGURE 1.

Metals which may be deposited as thin films, are for example, nickel, chromium, copper, tungsten, tin, zinc, lead, and the like.

One particularly advantageous method of bringing metal as vapors into the plating zone is in the form of readily decomposable gaseous compounds. For example, the metals may be introduced as gaseous metal carbonyls, also nitroxyl compounds, nitrosyl carbonyls, metal hydrides, metal alkyls, metal halides, and the like.

Illustrative compounds of the carbonyl type are nickel, iron, chromium, molybdenum, cobalt, and mixed carbonyls.

Illustrative compounds of other groups are the nitroxyls, such as copper nitroxyl; nitrosyl carbonyls, for example, cobalt nitrosyl carbonyl; hydrides, such as antimony hydride, tin hydride; metal alkyls, such as tetraethyl lead; metal halides, such as chromyl chloride; and carbonyl halogens, for example, osmium carbonyl bromide, ruthenium carbonyl chloride, and the like.

In the preparation of ionic crystals, to which the invention is adapted, crystals such as formed of sodium chloride, magnesium sulfate, sodium nitrate and the like are subjected to gas plating, as for example nickel carbonyl or the carbonyls of platinum, rhodium or the like, and metal acetylacetonates. The crystals are placed in a chamber or container and while heated to a temperature up to 600° C. or such as to be below the decomposition temperature of the crystals and yet be above the thermal decomposition temperature of the gaseous metal compounds and the crystals are subjected to gas plating with these thermally decomposable gaseous metal compounds.

After gas plating the crystals with the metal the same are then removed and subjected to leaching with water to remove the core and recover the porous metal shell portion of the particles. In this manner catalysts made of platinum, rhodium, copper, nickel and the like are readily obtained and wherein the particles are hollow, irregular shaped and provide a relatively large surface for contact during catalytic processes.

Other crystals which are adapted to be gas plated in accordance with this invention may comprise organics, plastics and the like, such as are soluble in organo solvents such as ether, dioxane, benzene, etc. As an example, petroleum wax particles such as formed of hard waxes, for example, Carnauba wax, are gas plated and then leached with benzene, kerosene or the like aliphatic or aromatic solvent so as to dissolve out the wax and to leave the metal. In this instance the gas plating is carried out at a temperature of around 250° F. and such as to prevent undue softening of the wax particles. Other organic substrate forming particles may comprise solid materials which are soluble in the organic solvent and which are capable of withstanding the temperature at which the thermally decomposable gaseous metal compound is operable.

The following examples are given to illustrate the invention and how it can be best utilized.

EXAMPLE 1

Salt crystals are plated with nickel carbonyl under the following conditions and utilizing argon as the inert carrier gas, together with a small proportion of ammonia ($NH_3$). The gas plating was conducted for a time of 20 minutes as follows:

Plating cycle—
- 4000 cc./m. argon
- 15 cc./m. $NH_3$
- 300 cc./m. $Ni(CO)_4$
- 340° F. temperature
- Time 20 minutes The salt particles then are leached with water the temperature of the water being approximately boiling (212° F.). After boiling for 15 minutes, substantially all of the sodium chloride crystals have been leached from the porous gas plated particles after which the water is drained off and the hollow, irregular shaped particles of nickel recovered. The particles are then allowed to air dry, or preferably are blown with warm air to evaporate any retained water from the leaching process, to recover finished hollow, irregular shaped metal particles.

EXAMPLE 2

The above process is carried out as in Example 1, using sand and wherein leaching process is eliminated to recover a sand particle having an outer shell of nickel metal. The process of the gas plating in this instance using the sand particles, was as follows:

Plating cycle—
- 3000 cc./m. argon
- 15 cc./m. $NH_3$
- 300 cc./m. $Ni(CO)_4$
- 370°–380° F. temperature
- 30 minutes plating time

EXAMPLE 3

In this example magnesium sulfate crystals were plated with copper, utilizing the same carrier gas and process with nickel carbonyl, as set out in Example 1. In this instance the metal coating is copper, using copper acetylacetonate as the gaseous metal thermally decomposable metal compound.

EXAMPLE 4

In this instance particles of crystal salt are plated with aluminum by the use of aluminum triisobutyl dissolved in heptane. The apparatus is first freed of air by flowing nitrogen (dry) through the apparatus or plating chamber for about 20 minutes to produce a plating chamber free of air.

Aluminum triisobutyl is carried into the plating chamber from a bubbler tube containing the compound dissolved in heptane. The aluminum triisobutyl is carried into the plating chamber by a nitrogen carrier gas. The plating chamber is heated to a temperature of around approximately 563° F. to cause the aluminum triisobutyl to heat decompose and deposit the aluminum. Thereafter the particles of salt comprising a shell of aluminum are leached to remove the salt and recover a relatively porous shell of aluminum.

EXAMPLE 5

In this instance platinum carbonyl is used to form a porous platinum irregular shaped particle and wherein salt sodium chloride crystals are used to receive the plating of platinum. The gas plating is carried out similarly as in Example 1, and the particles are leached to recover porous platinum irregular shaped particles.

EXAMPLE 6

In this instance carbon particles are coated with moylbdenum using molybdenum carbonyl in place of nickel carbonyl and carrying out the process similarly as in Example 2.

A suitable apparatus for carrying out the gas plating of particles made of crystals, and wherein the same are to be leached is disclosed in FIGURES 4 and 5. Referring to the figures, a rotary kiln 10 is utilized as a gas plating chamber, the same being adapted to be rotated in the conventional manner and using a motor 11 and driven pinion gear 12 which in turn meshes with ring gear 13. The ring gear 13 is suitably secured to the upper end of the kiln 10 and is adapted to be mounted on the bearing 14. The kiln proper is supported on the columns 15 and 16 which are provided with roller bearings 17 and 18 respectively.

To introduce the particles or crystals into the kiln, the same are placed in the hopper 20 which is provided with a gate 21 in the bottom portion thereof, which is swingable to introduce particles or crystals to be gas plated into the chamber 22 of the kiln. The hopper 20 is connected through a lower adapter portion 23 suitably supported as by the member 25, and is arranged to communicate to the interior of the kiln through the lower cylindrical portion 26, as shown in FIGURE 4. Suitable baffle members 28 are provided in the kiln which, as shown in FIGURE 5, are shifted to agitate the particles as the kiln 10 is rotated.

To introduce the gaseous metal thermally decomposable compound into the chamber 22 of the kiln, the same is brought in through the conduit 30, the same being mounted in the adapter portion provided to close the end of the kiln, as at 32. A depending portion 33 is connected with the adapter 32 and extends into the liquid leaching material 34 in the tank 35. Waste products are conducted out of the system through the conduit 37 which is suitably connected to the adapter 23 at the head of the kiln. This conduit 37 may be a flexible connection, as indicated in the drawing, and where desired conduit 37 may be connected to a vacuum pump or blower to provide suction where the same is desired.

The bottom gate or closure member 21 is suitably provided with sealing gasket means 40 to prevent gaseous products from passing out into the upper hopper portion 20. Gaskets formed of sponge rubber or flexible plastic hose elements are suitable to seal off the kiln.

In order to heat the kiln, suitable heaters such as shown at 41 and 42 are provided and which preferably are resistance heaters and heated by an electric source, not shown. Other heating means, of course, may be used, such as a gas burner or the like, and whereby the interior of the kiln chamber 22 is heated sufficiently so that the particles, as shown at 45, passing through the kiln are heated at a temperature high enough to cause heat decomposition of the gaseous metal compound introduced into the kiln chamber through the conduit 30, as aforemenitoned.

The leaching solution 34 will depend upon the core or substrate part of the particles being gas plated. Where the particles are soluble in water, then the leaching solution will be water, and when the particles are not soluble in water and are soluble in organic compounds such as petroleum solvents as aforementioned, then the leaching solution will be petroleum solvent, e.g., benzene or the like. Also aliphatic organic solvents may be used, for example ethyl alcohol, acetone and the like. Other organic solvent compounds, preferably of the short chain (2 to 10 carbons) type, and which are commercially available may be used to dissolve the core and leave the metal shell portion. Particles of metal after leaching will accumulate in the bottom of the leaching tank, as at 48. The same will be recovered by draining off the leaching solution and centrifuging the particles to remove retained leaching solution and the particles are then air dried as by the use of a blower which delivers warm air (80–100° F.) onto the particles.

The particles, as shown in FIGURE 2, provide a substrate or core which is coated with a porous shell of metal, such as shown at 50 in FIGURE 2, and 51 in FIGURE 3. In FIGURE 2 the solid particle is unleached whereas in FIGURE 3 the particle illustrated is such as after leaching away of the core so as to leave an open space as at 52.

In the gas plating process, control of the metal deposit is accomplished by (a) regulating the carrier or inert gas concentration, (b) rate of flow of the plating gas atmosphere, and (c) temperature of the core or objects being gas plated. The inert carrier gas useful for carrying out the gas plating includes as well as argon, helium, carbon dioxide, hydrogen, nitrogen and the like. A thickness of metal deposit of about 0.001 inch is achieved in approximately three to fifteen minutes, depending upon the gaseous metal compound used and its concentration as described.

The gas plating deposits metal into the pores and interstices of the substrate material, and the adherence of the plated metal to the surface, when free of foreign matter, is tenacious and of uniform thickness.

In the preparation of gas plate shell particles for use as catalyst, the solid portion forming the core, which is gas plated and then leached to provide a metal shell, may be in the form of powder, e.g., particles having a size of less than one micron, e.g., 0.00015 to 0.01 micron. Further, where the catalyst is desired in oxide form, the nascent gas plated metal deposit may be heated in the presence of air or oxygen to form the oxide.

The formation of the metal particles in accordance with this invention by gas plating a leachable core or substrate, produces a metal particle having a porous outer surface as well as an inner surface which is relatively porous and irregular. A metal particle is thus produced having a very large surface area, and many times that produced by a solid spherical or irregular shaped solid particle. This is due to the outer and inner porous wall structure of the leached gas plated shell of each metal particle.

The gas plating process of the invention provides for the production of particles having an outer shell or coating of metal, the particles being of a low micron and preferably submicron size. The smaller the particle size, the greater the contact surface area. Considering for example spherically shaped particles, the enormous increase in total area as the particle size decreases is shown by the following table:

| Sphere Diameter | No. of Spheres | Total Area, Centimeters $^2$ |
|---|---|---|
| 2 cm | 1 | 12.5 |
| 1 cm | 8 | 25 |
| .1 cm | $8\times10^3$ | 250 |
| .01 cm | $8\times10^6$ | 2,500 |
| .001 cm | $8\times10^9$ | 25,000 |
| .0001 cm. (1 micron) | $8\times10^{12}$ | 250,000 |
| .00001 cm. (.1 micron) | $8\times10^{15}$ | 2,500,000 |
| .000001 cm. (.01 micron) | $8\times10^{18}$ | 25,000,000 |
| .0000001 cm. (.001 micron) | $8\times10^{21}$ | 250,000,000 |

As will be observed from the above table, it is desirable to keep the particle size about 0.01 micron and smaller in order to gain the large increase in total area. Such large contact area is particularly important when the particles are to be gas plated with a catalytic metal, e.g., platinum, nickel aluminum etc., or a combination of metals or metal alloy to provide the catalytic agent. The low micron size particles may be gas plated with a single deposit of metal or a plurality of metals as desired. A porous deposit of metal permits the inner core or substrate of material to be readily leached away to leave a hollow foraminous metal shell, the particles being of substantially uniform size and of submicron size in diameter to obtain the maximum surface area.

Although the gas plating process may be readily carried out at ordinary atmospheric pressure conditions, subatmospheric pressures may be used. For example, pressures from 0.01 to 0.1 millimeter of mercury may be maintained in the plating chamber during gas plating.

Each material from which a metal may be plated has a temperature at which decomposition is complete. However, decomposition may take place slowly at a lower temperature or while the vapors are being raised in temperature through some particular range. For example, nickel carbonyl completely decomposes at a temperature in the range of 375° F. to 400° F. However, nickel carbonyl starts to decompose slowly at about 175° F. and, therefore, decomposition continues during the time of heating from 200° F. to 380° F.

A large number of the metal carbonyls and hydrides may be effectively and efficiently decomposed at a temperature in the range of 350° F. to 450° F. When working with most metal carbonyls we prefer to operate in a temperature range of 375° F. to 425° F.

Maintenance of the object at temperatures generally in the decomposition range is readily accomplished by causing the object to be heated by infra-red rays or by induction heating. The advantage of this type of heating is its ready control within the temperature ranges utilized in the process. These temperatures generally range from 350° F. to 450° F. in the plating zones and from 800° F. to 1200° F. in the annealing zones.

To produce a porous metal shell, as illustrated in FIGURE 6, the gas plating is controlled so that a very thin film metal deposit forms on the leachable solid substrate material. For example, by exposing the substrate to ten to twenty seconds with the thermally decomposable metal compound, a layer of 0.0001 to 0.00025 inch is formed which is porous. By terminating the gas plating after depositing this thin porous metal coating when the solid core or substrate is leached, a porous metal shell is obtained. Such a porous metal shell particle has increased surface area which is important when the metal particles are to be used as a catalyst.

It will be understood that while the method and apparatus disclosed and described herein illustrates a preferred form of the invention, modifications may be made therein without departing from the spirit and scope of this invention, and such modifications as occur to those skilled in the art are intended to be covered in the appended claims.

What is claimed is:

1. A method of producing metal particles which comprises establishing a source of dry inert gas and a source of thermally decomposable gaseous metal compound, heating solid particles to be gas plated in an inert atmosphere, contacting the particles with the gaseous metal compound while the particles are heated to a temperature high enough to thermally decompose the gaseous metal compound and depositing the metal onto the heated particles, leaching the resultant metal coated particles with a solvent which dissolves the inner core of the particle leaving the outer metal shell, and recovering the metal shell particles.

2. A method of producing porous metal particles in finely divided condition, comprising the steps of providing solid particles of the material which is leachable, heating said particles in an inert atmosphere, contacting the heated particle with gaseous metal compound while the temperature of said particles is high enough to cause said gaseous metal compound to decompose and deposit the metal onto the surface of the particles, thereafter leaching the gas plated particles with solvent which dissolves the solid particles leaving metal shell particles.

3. A method of producing porous metal particles in finely divided condition, comprising the steps of providing solid particles of the material which is leachable, heating said particles in an inert atmosphere, contacting the heated particle with gaseous metal compound while the temperature of said particles is high enough to cause said gaseous metal compound to decompose and deposit the metal onto the surface of the particles, thereafter leaching the gas plated particles with solvent which dissolves the solid particles leaving metal shell particles, mechanically separating said leached metal particles from the leaching solution, and drying the particles to remove residual leaching solvent.

4. A method of producing porous metal particles of irregular shape, comprising subjecting a leachable solid to gas plating by thermally decomposing the gaseous metal compound brought in contact therewith, leaching the resultant metal plated particles with a solvent to dissolve the solid core leaving a shell of metal, and separating the metal shell from the leaching solvent.

5. A method of producing metal particles of irregular shape, comprising subjecting a leachable solid to gas plating by thermally decomposing a gaseous metal carbonyl brought in contact therewith, leaching the resultant metal plated particles with a solvent to dissolve the solid core leaving a shell of metal, and separating the metal shell from the leaching solvent.

6. A method of producing metal particles of irregular shape, comprising subjecting a leachable solid to gas plating by thermally decomposing organo metal compounds brought in contact therewith, leaching the resultant metal plated particles with a solvent to dissolve the solid core leaving a shell of metal, and separating the metal shell from the leaching solvent.

7. A process for producing a metal catalyst comprising the steps of heating solid particles which are leachable by a solvent selected from the group consisting of water, aliphatic organic solvent, and aromatic organic solvent, subjecting the said particles to gaseous metal plating by heating the particles and contacting the same with a thermally decomposable gaseous metal compound to plate the same with metal, leaching the resultant gas plated particles with said solvent to provide metal particles, and separating said metal particles from the leaching solvent to recover a powdered metal catalyst.

8. An article of manufacture produced in accordance with the process of claim 1.

*9. A process for producing a porous metal article comprising the steps of heating solid inorganic salt particles in an inert atmosphere and which particles are leachable with water, subjecting the resultant heated particles to gaseous metal plating by heating the particles and contacting the same with a thermally decomposable gaseous metal compound to plate the same with metal, leaching the resultant gas plated salt particles with water to dissolve the solid core portion of said particles and leave metal shell particles, separating said metal shell particles from the leaching water to recover porous metal particles, and drying the particles to form a relatively dry porous metal product.*

*10. A process for producing a porous metal article comprising the steps of heating solid inorganic salt particles in an inert atmosphere and which particles are leachable with water, said inorganic salt particles being selected from the group consisting of sodium chloride particles and magnesium sulfate particles, subjecting the resultant heated particles to gaseous metal plating by heating the particles and contacting the same with a thermally decomposable gaseous metal compound to plate the same with metal, leaching the resultant gas plated inorganic salt particles with water to dissolve the solid core portion of said particles and leave porous metal shell particles, and separating said metal shell particles from the leaching water to recover the same.*

*11. A process for producing a porous metal article comprising the steps of heating solid inorganic salt particles in an inert atmosphere and which particles are leachable with water, said inorganic salt particles consisting of sodium chloride crystals, subjecting the resultant heated particles to gaseous metal plating by heating the particles and contacting the same with a thermally decomposable gaseous metal compound to plate the same with metal, leaching the resultant plated inorganic salt particles with water to dissolve the solid core portion of said particles and leave porous metal shell particles, separating said metal shell particles from the leaching water to recover the same.*

*12. A process for producing a porous metal article comprising the steps of heating solid inorganic salt particles in an inert atmosphere and which particles are leachable with water, said inorganic salt particles consisting of magnesium sulfate particles, subjecting the resultant heated particles to gaseous metal plating by heating the particles and contacting the same with a thermally decomposable gaseous metal compound to plate the same with metal, leaching the resultant gas plated inorganic salt particles with water to dissolve the solid core portion of said particles and leave porous metal shell particles, separating said metal shell particles from the leaching water to recover the same.*

*13. A process for producing a porous metal particle comprising the steps of heating solid inorganic salt particles in an inert atmosphere and which particles are leachable with water, said inorganic salt particles consisting of sodium chloride crystals, subjecting the resultant heated particles to gaseous metal plating by heating the particles to 340° F. in an atmosphere of argon and ammonia gas, and contacting the same while retained in said atmosphere with a thermally decomposable gaseous metal compound consisting of nickel carbonyl which decomposes at the temperature of said salt particles to plate the same with nickel, leaching the resultant nickel plated salt particles with water to dissolve the solid core salt portion of said particles and leave porous metal shell particles of nickel, and separating said metal shell particles from the leaching water and drying the same to produce a catalyst.*

*14. As an article of manufacture produced in accordance with the process of claim 9 and composed of metal particles which are of irregular shape and hollow, said hollow metal shape being porous and having walls of substantially uniform thickness.*

References Cited in the file of this patent or the original patent

| | | |
|---|---|---|
| 2,382,371 | Utterback | Aug. 14, 1945 |
| 2,599,978 | Davis et al. | June 10, 1952 |
| 2,702,524 | Fruth | Feb. 22, 1955 |
| 2,798,051 | Bicek | July 2, 1957 |
| 2,817,311 | Nack | Dec. 24, 1957 |

OTHER REFERENCES

Ser. No. 357,989, Brendlein (A.P.C.), published May 25, 1943.